US007083841B2

(12) United States Patent
Oakey et al.

(10) Patent No.: US 7,083,841 B2
(45) **Date of Patent: *Aug. 1, 2006**

(54) ORTHOGONALLY AMBIGUOUS CARPET TILES HAVING CURVED ELEMENTS

(75) Inventors: David D. Oakey, LaGrange, GA (US); Sydney D. Daniel, LaGrange, GA (US)

(73) Assignee: Interface, Inc., Atlanta, GA (US)

( * ) Notice: Subject to any disclaimer, the term of this patent is extended or adjusted under 35 U.S.C. 154(b) by 279 days.

This patent is subject to a terminal disclaimer.

(21) Appl. No.: 10/165,842

(22) Filed: Jun. 7, 2002

(65) Prior Publication Data

US 2003/0031821 A1 Feb. 13, 2003

Related U.S. Application Data

(63) Continuation-in-part of application No. 09/783,354, filed on Feb. 14, 2001.

(51) Int. Cl.
*B32B 3/14* (2006.01)
*B32B 33/00* (2006.01)

(52) U.S. Cl. .............................. 428/88; 428/89; 428/44; 428/48

(58) Field of Classification Search ................... 428/88, 428/89, 44, 48; D06/582, 588; D05/62; D25/157, D25/158, 136, 163
See application file for complete search history.

(56) References Cited

U.S. PATENT DOCUMENTS 3,850,783 A 11/1974 Peters et al.
3,875,716 A 4/1975 Eusemann
5,011,411 A 4/1991 Loewy
5,198,277 A 3/1993 Hamilton
6,203,879 B1 3/2001 Desai
6,526,704 B1 3/2003 Berard et al.
2002/0136855 A1 9/2002 Daniel et al.

FOREIGN PATENT DOCUMENTS

BE 890 436 A 1/1982
EP 0 698 863 A 2/1996
GB 1 537 727 A 1/1979
JP 4-125773 11/1992
JP 5-163825 6/1993
JP 2003-96654 4/2003

OTHER PUBLICATIONS

Supplemental Information Disclosure Statement Dated Nov. 18, 2005 and Exhibits thereto as follows.

(Continued)

*Primary Examiner*—Cheryl A. Juska
(74) *Attorney, Agent, or Firm*—Kilpatrick Stockton LLP; John S. Pratt; Kristin J. Doyle

(57) ABSTRACT

Carpet tiles having patterns and color schemes that obviate the need to orient the tiles in a particular positional or rotational relationship relative to each other. The tiles exhibit orthogonal ambiguity, meaning that they may be laid in any side-by-side orientation with respect to adjacent tiles without looking out of place to the ordinary viewer and thereby still achieving an appearance of continuity like broadloom carpet. Each tile has patterns of shapes having some straight and curved elements. At least some of the straight elements on each tile preferably parallel a tile edge. The shapes are formed from a color or combination of colors so that adjacent shapes on each tile have at least one color in common. Furthermore, each tile has at least one color in common with every other tile, so that when the tiles are laid, the colors on adjacent tiles coordinate. Moreover, because the pattern on each tile appears random, placement of the tiles on the floor in any side-by-side orientation simply creates a larger, apparently random pattern, rendering it impossible for any tile to look out of place.

23 Claims, 7 Drawing Sheets

(2 of 7 Drawing Sheet(s) Filed in Color)

OTHER PUBLICATIONS

Exhibit A: Collins & Aikman Floorcoverings, Inc., Mohawk Industries, Inc., Mohawk Brands Inc., and Shaw Industries Group, Inc., Plantiffs, v. Interface, Inc., Defendant, USDC, Northern District of GA, Rome Division, Civil Action No. 4:05–CV–00133–HLM, Amended Complaint dated Sep. 26, 2005.

Exhibit B: Declaration of David D. Oakey, dated Nov. 16, 2005.

Notice of filing of Submission of Publications Etc. Issued by the Japanese Patent Office on Jan. 18, 2005 in JP 2002–564181 (published as JP 2004–524452).

Submission of Publications Etc. filed with the Japanese Patent Office on Nov. 1, 2004 in JP 2002–564181 (published as JP 2004–524452).

Notice of the Reasons for Refusal issued by Japanese Patent Office on Dec. 15, 2003 in JP 2001–288184 (published as 2003–98654).

Decision of Refusal issued by Japanese Patent Office on Mar. 5, 2004 in JP 2001–288184 (published as JP 2003–96654).

Color copy of a specification page for product NT 2100 in Carpet Tile catalog from Sangetsu, dated 1997–1999.

Patent Abstracts of Japan, JP 2003–96854 (Nippon Jutan KK) Apr. 3, 2003.

esp@cenet Worldwide database, JP 5–163825 (Nippon Jutan KK) Jun. 29, 1993.

ORTHOGONALLY AMBIGUOUS CARPET TILES HAVING CURVED ELEMENTS

CROSS-REFERENCE TO RELATED APPLICATION

This application is a continuation-in-part application of U.S. patent application Ser. No. 09/783,354, filed Feb. 14, 2001, which is incorporated herein by reference.

FIELD OF THE INVENTION

This invention relates generally to carpet tiles and a method of designing carpet tiles having patterns and color schemes that allow for placement of the carpet tiles in any orientation with respect to adjacent carpet tiles while still achieving the appearance of broadloom carpet.

BACKGROUND OF THE INVENTION

Conventional carpet tile has historically been a product that sought to mimic the appearance of broadloom carpet and to hide or at least de-emphasize the fact that the product was modular. Achieving this result has required, at minimum, that carpet tiles or modules be placed in a flooring installation with the same orientation, and often in the same relative position on the web, that the modules had at the time they were produced. This is because conventional carpet tiles, particularly including tufted, fusion bonded, or woven face carpet tiles, normally have a "direction" as a result of (1) the manufacturing process and/or (2) the pattern on the tiles.

Conventional production techniques, particularly including tufting techniques, cause the carpet pile to lean or have a nap direction. This property of conventional carpet modules causes a tile (even a solid color tile) within a field of tiles to have a different appearance, particularly under certain lighting and viewing conditions, if it is oriented in a different direction than the tiles with which it is placed. Thus, historically the tiles have all been oriented in the same direction (i.e., they all have uniform rotational orientation). Uniform rotational orientation during module installation is facilitated by the presence of direction indicia on the modules, which usually is placed on the back or underside of the modules, and requires careful attention to rotational orientation during installation. In addition to concerns about nap direction, minor variations in color require that carpet tiles in a particular installation all use yarn dyed in the same dye lot to avoid visually discernable differences between adjacent carpet tiles resulting from variations in dying.

Moreover, the presence of a pattern that spans more than one tile in the web from which the tiles are cut has also sometimes required that not only the rotational orientation of tiles in an installation be the same but for the tiles to be located in particular relative positions. Thus, after the carpet web is cut into tiles, the tiles must be oriented on the floor so that their pattern aligns with the patterns on adjacent tiles or with the appearance of adjacent tiles. Indeed, schemes for insuring or facilitating placement of modular carpet in predetermined relative positions (as well as rotational orientation) have been developed. One such approach is suggested in U.S. Pat. Nos. 6,197,400 and 6,203,879, both to Desai.

Most carpet tiles are square. If a first carpet tile is placed on the floor, a second tile may be placed in four different positions relative to each side of the first tile by rotating the second tile in 90° increments relative to the first carpet tile and may be placed in four different locations by placing the second tile adjacent to each of the four sides of the first tile. In only one of the second tile's four rotational positions is the second tile oriented in the same "direction" as the first tile, so that both tiles are in the same rotational orientation as they were relative to each other in the carpet web from which they were cut or as they came off of the carpet producing machine. Moreover, some patterns used on carpet tiles require that the second tile be placed only adjacent to a particular side or sides of the first tile, rather than adjacent to any of the four sides of the first tile. If one carpet tile in an installation is oriented improperly with respect to adjacent carpet tiles, it is usually readily apparent that the tile has been misplaced, thereby destroying the appearance of continuity of pattern, nap, and color of the entire carpet tile installation. The carpet installer, therefore, must spend valuable time during installation ensuring proper orientation of the tiles. Moreover, an important benefit of modular flooring is the opportunity it affords to easily replace selected portions of the flooring, such as when a carpet tile is stained or worn. Often, however, a replacement carpet tile will be unacceptably prominent in appearance when installed together with tiles that have been in use for some time.

One approach to some of the challenges associated with modular flooring described above has been to produce first a web, and then modules of flooring, that are uniform in color and carry no pattern, so that only nap direction and dye lot are important and there are no problems of registration between a tile pattern or design and the tile edges. This makes relative tile position irrelevant. In other instances, tile producers have sought to address the design-to-module registration issues by first producing a uniform color tile or module and then printing a design on the face of the tile that is positioned by reference to the tile edges after the tile is cut from the web. There are, however, design, cost and functional limitations associated with printing on textile face modular flooring. A third approach has been to use relatively small design elements so that such elements at a tile edge will not look odd near tile edges or if they are cut by tile edges.

Moreover, textile face modular flooring designers have recently begun to design flooring and flooring installations that do not seek to mask, but rather showcase or celebrate, the modularity of the flooring. For instance, modules are installed "quarter-turned" with each tile position rotated 90° relative to each adjacent tile. In other instances, module edges are emphasized to achieve an installation appearance similar to that of ceramic tile separated by grout.

There continues, however, to be substantial demand for flooring designs that do not visually emphasize the modularity of flooring components but instead appear to have a design that spans the entire flooring installation or part of the flooring installation rather than appearing to be confined to individual modules so that the modules may be placed in any orientation with respect to adjacent carpet tiles while still achieving the appearance of broadloom carpet.

SUMMARY OF THE INVENTION

This invention addresses the above-described problems by providing carpet tiles and a method of making carpet tiles having patterns and color schemes that obviate the need to orient the tiles (with respect to pattern or nap) relative to each other and that generally eliminate the need to match tiles as to dye lot. Instead, the tiles exhibit orthogonal ambiguity, meaning that the appearance of the face of the tiles (as well as their shape) enables the tiles to be laid in any side-by-side orientation with respect to adjacent tiles without looking out of place to the ordinary viewer and thereby still achieving an appearance of continuity across the entire installation as if the tiles were part of a broadloom web.

"Orthogonally ambiguous" tiles must be positioned in one of sixteen positions relative to each other tile. Such positioning is achieved by rotating adjacent tiles in ninety degree increments relative to each other and by positioning one of the tiles in each of the four possible locations relative to the other tile. A "rotational position indeterminate" carpet web pattern can be imaged in which any tile can be cut from the web in any rotational position relative to any other tile cut from the web, including a rotational position displaced by other than ninety degree increments (e.g. forty-five degrees). However, cutting tiles from a web at such orientations would generally produce substantial waste and be impractical.

The eye/brain visual system is remarkably sensitive to visual patterns and wonderfully adept at recognizing patterns. This ability is apparently an element of how the brain deals with and makes sense of the jumble of "data" in any visual field. The brain recognizes pattern in a relatively few bits of data and thereby identifies objects in the visual field without the need to "analyze" all of the available data.

The same pattern recognition ability makes it challenging to design modular, pattern-bearing units that present the same visual impression when modules are rotated or moved relative to each other, because the brain easily detects subtle "pattern interruptions." Successful design of orthogonally ambiguous carpet tiles thus requires designs that do not carry pattern-interruption clues and that incorporate design features that fool the brain's pattern recognition abilities.

This is accomplished in this invention using a pattern including an assembly of visual features, including shapes, that appear to be, but are not, arbitrarily oriented. Rather, the features are oriented so that they, in combination, present an appearance that does not present a discernable pattern change when tiles bearing the pattern are rotated or moved relative to each other. While consideration is given to feature placement in the pattern, the overall appearance of the pattern is random. "Random" in this application is not used in the sense that, for example, dots of color thrown on a background are random. Rather, unlike such dots where no organization is detectable, the patterns of this invention clearly include detectable shapes and other design elements visible, at least in part, to the human eye. But, while these features are identifiable, their placement in the pattern is such that they appear to be randomly placed. Rotation or movement of the tiles discernably changes the position and orientation of tile features, but still results in a random appearance that is indiscernible as different from the previous pattern. The function of this invention can be analogized to a "carpet" of dead leaves on a forest floor. While the shapes of the individual leaves in the pile are discernable, if the leaves are thrown in the air and settle into a new pile, while the relative position of the leaves has obviously been changed, the overall appearance of the "carpet" of leaves is the same.

One embodiment of this invention includes shapes having both straight and curved elements. The pattern preferably includes both straight elements parallel and straight elements not parallel the tile edges. The shapes are preferably formed from a color or combination of colors so that adjacent shapes on each tile have at least one color in common. Furthermore, each tile preferably has at least one color in common with every other tile, so that when the tiles are laid, the colors on adjacent tiles coordinate. All of the colors typically may have similar intensities so that no one color significantly stands out from the other colors.

The orthogonally ambiguous tiles of this invention are produced by first producing a carpet web having a pattern exhibiting the characteristics described herein and then cutting the web into tiles in the conventional ways that tiles are typically cut from a carpet web produced for that purpose. Because the pattern on each tile appears random, placement of the tiles on the floor in any orientation simply creates a larger, apparently random pattern, rendering it impossible for any tile to look out of place. Such apparent randomness masks the visual effects of having adjacent carpet tiles with misaligned or differently-oriented naps and also masks slight color variations resulting from dye lot differences or differences in wear. Given the apparent randomness of the pattern and color scheme, worn or soiled tiles in a particular installation may easily be replaced with an unused tile without the new tile looking as dramatically different from the remaining tiles as often results with tiles with conventional patterns.

It is thus an object of this invention to provide carpet tiles that may be laid in any orientation with respect to each other and still achieve the appearance of a continuous piece of broadloom carpet.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE DRAWINGS

Figure 1:
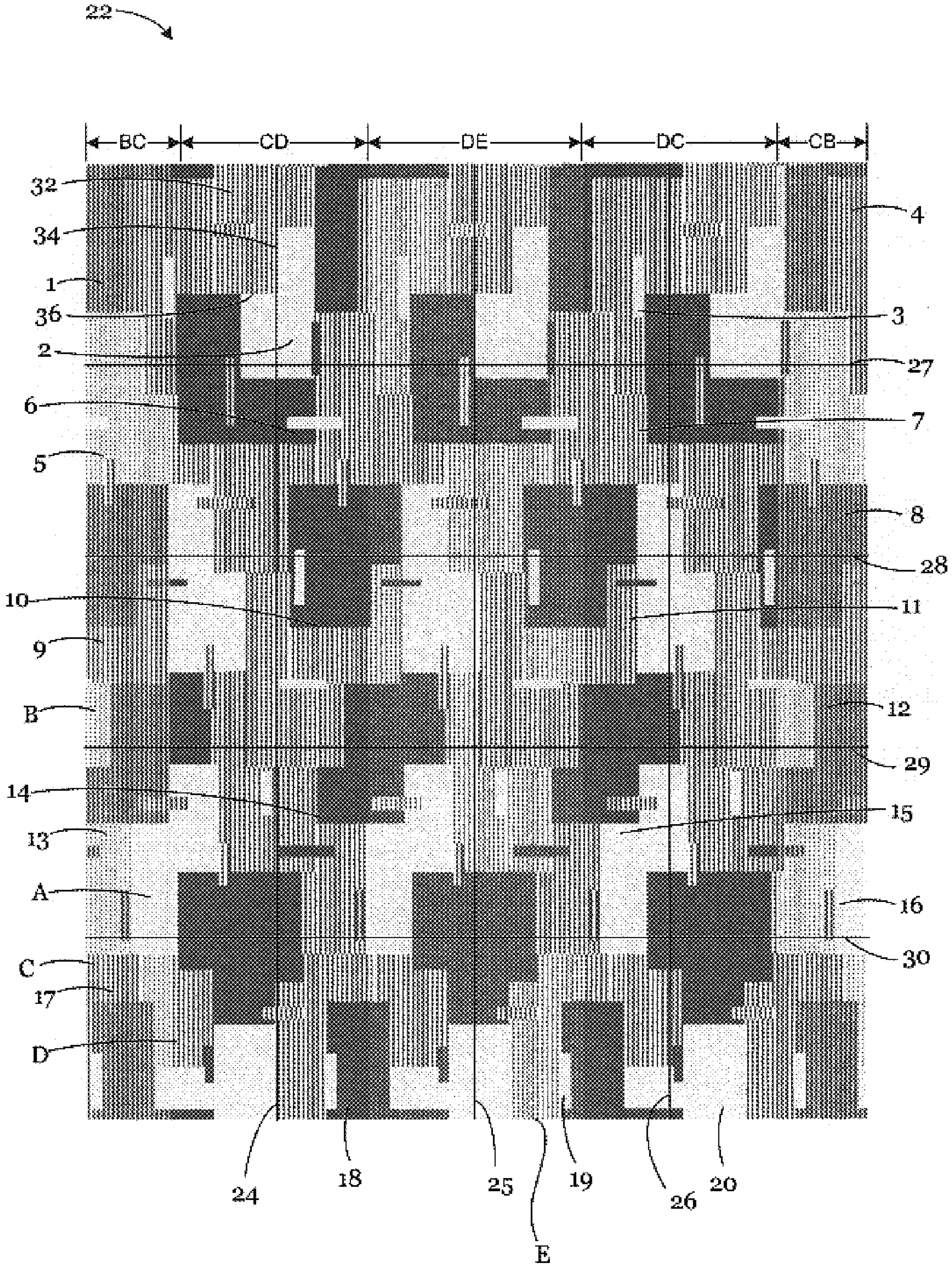
FIG. 1 is a top plan view of a carpet tile web produced in accordance with one embodiment of this invention.
Figure 2:
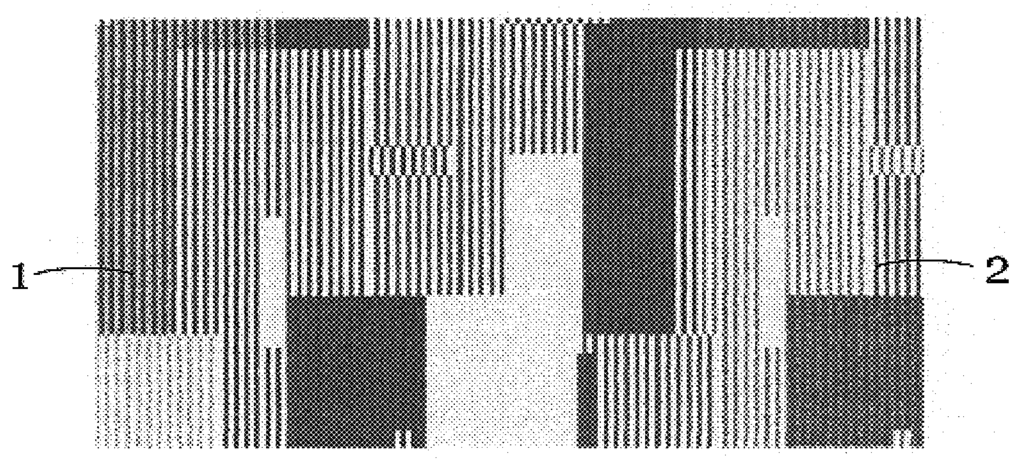
FIG. 2 is a top plan view of two carpet tiles produced in accordance with this invention positioned in a first orientation relative to each other.
Figure 3:
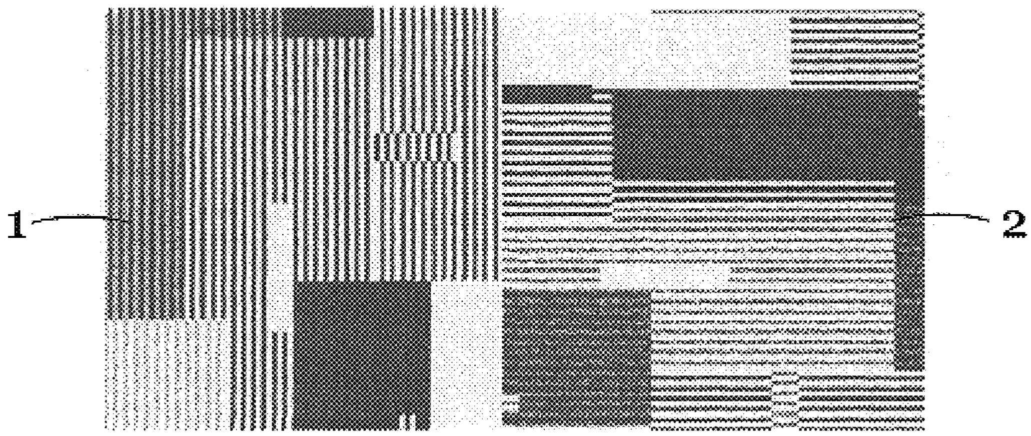
FIG. 3 is a top plan view of the two carpet tiles illustrated in FIG. 2 with one of the tiles rotated ninety degrees from the orientation illustrated in FIG. 2.

FIG. 1 illustrates a carpet web 22 having a pattern consistent with this invention. Longitudinal partition lines 24–26 and horizontal partition lines 27–30 show how the web 22 may be partitioned into twenty individual carpet tiles 1–20. A number of factors contribute to the orthogonal ambiguity of each carpet tile, including pattern shapes and arrangement and shape colors.

The pattern produced on web 22 produces tiles with shapes that appear randomly positioned on the tile. Shapes having certain characteristics are preferable. First, at least some of the shapes should have straight sides parallel to the "machine" and "cross-machine" direction of the web 22, and therefore parallel to the tile edges. For instance, shape 32 in FIG. 1 has a straight side 34 parallel to longitudinal partition line 24 and therefore parallel to the edge of tile 1 that will be defined by longitudinal partition line 24. Similarly, shape 32 has a straight side 36 parallel to horizontal partition line 27, and it, too, will parallel the edge of tile 1 that will be defined by horizontal partition line 27. Partition line 24 will pass through and partition shape 32, thereby resulting in a portion of shape 32 ending up on each of tile 1 and 2. However, the straight edge of shape 32 that will appear on each of tile 1 and 2 will not appear to be out of place because similar-looking elements appear within the tiles.

Size of the shapes within the pattern is also important, as is lateral position of the shapes within the web. The shapes must generally be small enough so that several shapes will end up positioned within each tile. Otherwise, the fraction or fractions of larger shapes falling on a particular carpet tile would potentially look odd. Shapes should be positioned laterally within the web so that longitudinal partition lines 24, 25, and 26 do not partition a shape so that an oddly narrow portion falls on one of the tiles.

Each tile preferably has the same background color. At least one color, different from the background color, is used to form the shapes on the tile. Regardless of how many colors are used, all of the colors preferably have similar intensities so that no one color significantly stands out from the other colors. Note that multiple shapes may be, and preferably should be, formed on each tile. It is important, however, that each shape have at least one color in common with adjacent shapes on the tile. Use of multiple shapes and colors contributes to the apparent random quality of the pattern, thereby making an installation of such tiles appear to be continuous without regard to the orthogonal orientation of the tiles within the installation.

While the adjacent shapes of each tile have at least one color in common, additionally, each tile preferably has at least one color in common (in addition to the background color) with every other tile, so that when the tiles are laid, the colors on adjacent tiles will coordinate.

Because the pattern on each tile appears random, placement of the tiles on the floor in any orientation simply creates a larger, apparently random pattern, rendering it impossible for any tile to look out of place. Such apparent randomness obviates the need to align the nap or "direction" of adjacent tiles, as misaligned naps further enhance the random appearance of the carpeting. Such randomness also masks color variation resulting from dye lot differences.

In summary, the preferred guidelines for creating web patterns in accordance with this invention are as follows. All of these guidelines need not necessarily be incorporated in every pattern.

1. Utilization of a background color for the entire web from which tiles will be cut.
2. Utilization of a pattern of shapes on the web formed by colors of approximately the same intensity as the background color and each other.
3. Utilization of shapes small enough for several to appear on each tile.
4. Utilization of shapes having straight edges parallel to the tile edges.
5. Utilization of a pattern causing each tile cut from the web to have at least one color in common with each other tile.

The carpet web 22 shown in FIG. 1 practices these rules and may be formed by a conventional carpet tufting machine. For example, a tufting machine having two rows of needles may be used. One row of needles may be threaded with a single background color that is present across the entire carpet web 22. The second row of needles may be threaded with yarns of other colors as described below. The pattern of shapes may be created on the carpet web by controlling the height of the yarn. The farther the yarn is pushed through the primary backing, the greater its height in the finished carpet tile and the more predominant the color of the yarn is to the ordinary observer. In the pattern shown in FIG. 1, the background yarn A tufts have a uniform height across their entire pattern, so that at least some background yarn A is visible in all areas of the pattern, and some areas show only background yarn A.

For ease of manufacture, in the embodiment shown in FIG. 1 the color scheme of the carpet web 22 is symmetrical about the central, longitudinal partition line (and also longitudinal axis) 25 of the carpet web 22. This means that the two side-by-side tiles 1 and 2 on one side of a production line can be boxed together, while the two side-by-side tiles 3 and 4 on the other side of the production line can be boxed together, and all boxes will have the same proportions of tiles having a particular color combination. This symmetry would not be necessary if tiles from the entire line were used to fill all of the boxes or other packages of tiles produced together.

The background color A (in this instance, yellow) is tufted over the entirety of the carpet web 22. The patterns of the outer portions BC of the web 22 are further formed from alternating colors B and C (light green and dark green, respectively, in this embodiment). Directly adjacent the outer portions BC, the patterns of middle portions CD are further formed from alternating colors C and D (dark green and blue, respectively, in this embodiment). Finally, the patterns of center portion DE are further formed from alternating colors D and E (blue and purple, respectively, in this embodiment).

While the carpet web 22 may be divided into any number of tiles, the carpet web 22 of FIG. 1 is divided into tiles 1–20 so that at least part of each tile has the color schemes of at least two of the portions—BC, CD, and DE. For example, outer portion BC and middle portion CD make up tile 1. In this embodiment, the shapes of tile 1 are made from: (1) the background color A only; (2) the background color A and color B only; (3) the background color A and color C only; (4) the background color A, color B, and color C; (5) the background color A and color D only; and (6) the background color A, color C, and color D. In this way, adjacent shapes of each tile have at least one common color.

Moreover, adjacent tiles have at least one color in common (in addition to the background color). For example, tile 1 and tile 2 have both color C and color D in common. When the tiles are placed on the floor, therefore, the colors on these adjacent tiles blend to facilitate the appearance of continuity.

Figure 4:
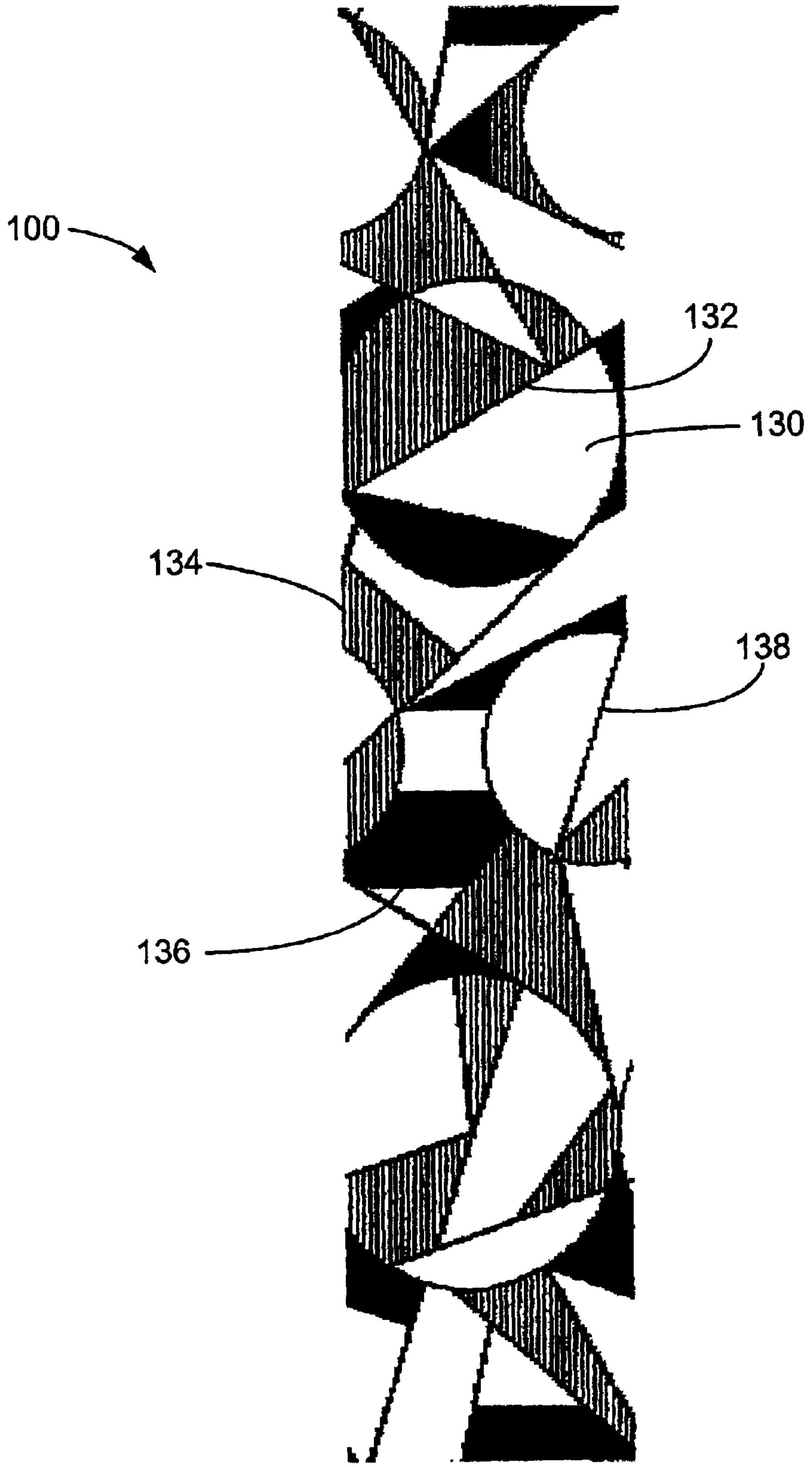
FIG. 4 is a top plan view of a carpet web pattern in accordance with an alternative embodiment of this invention.
Figure 5:
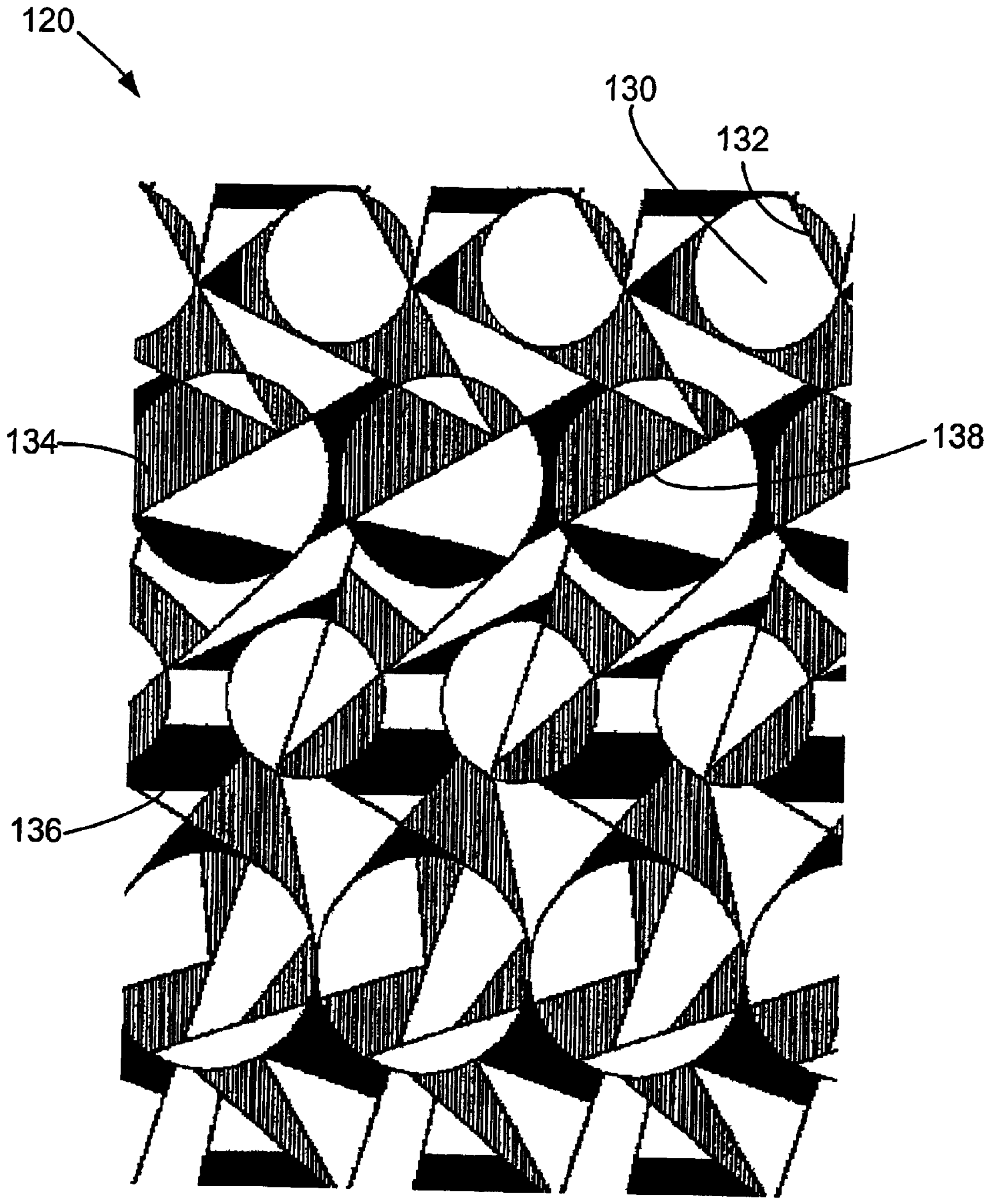
FIG. 5 is a top plan view of a carpet tile web pattern repeating the pattern of FIG. 4.
Figure 6:
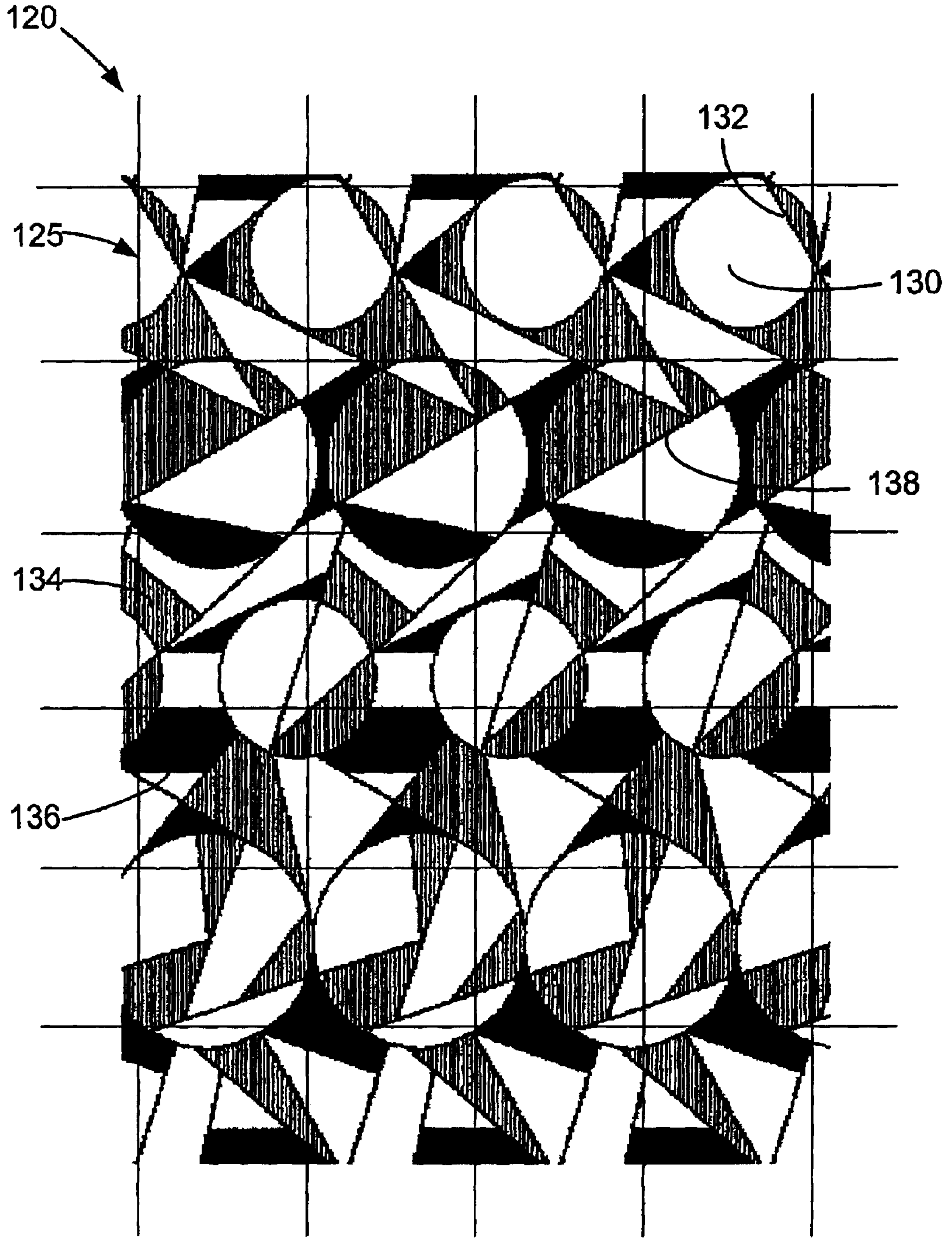
FIG. 6 is a top plan view of the carpet tile web pattern of FIG. 5 partitioned into carpet tile face designs.
Figure 7:
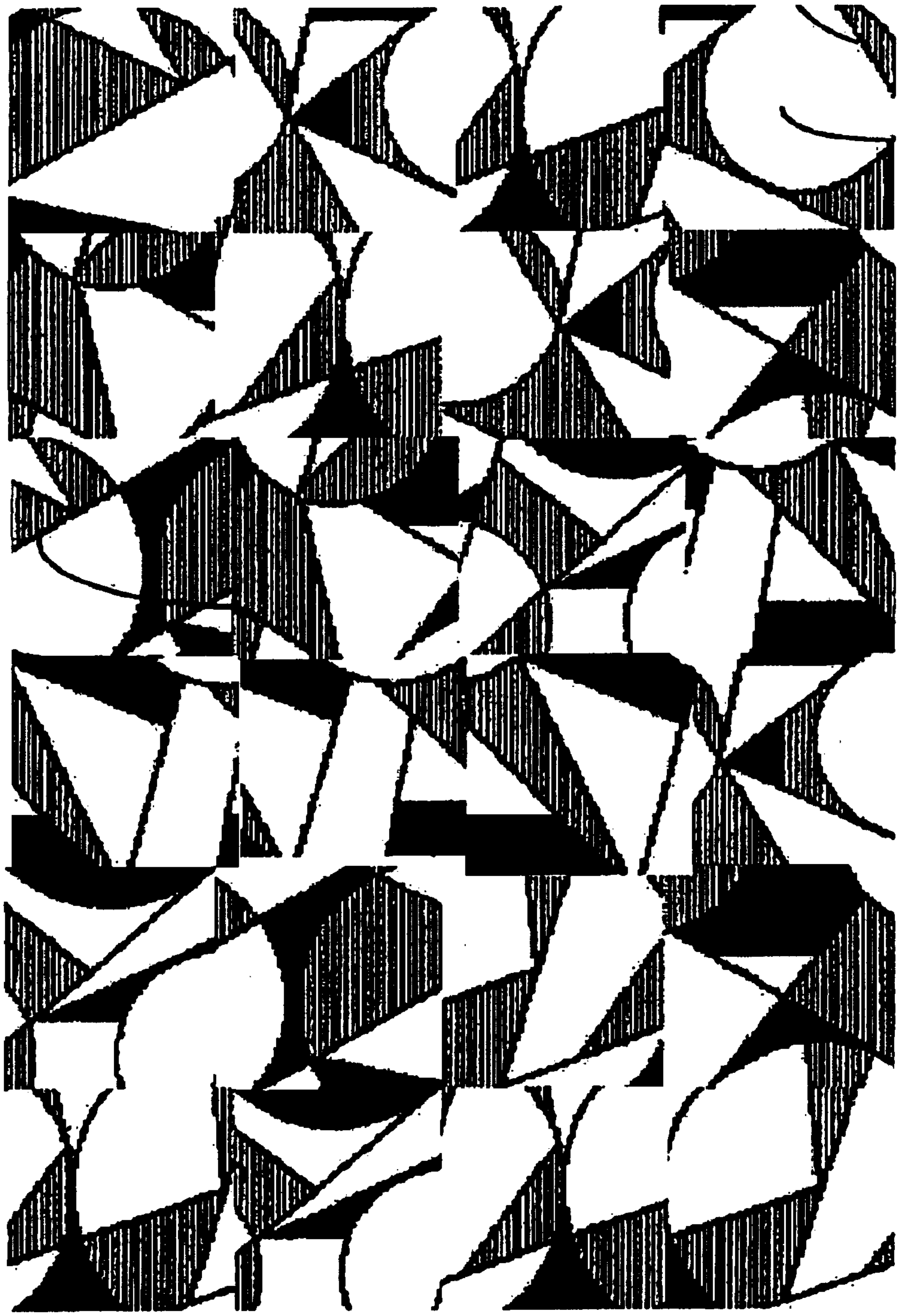
FIG. 7 is a top plan view of an assembly of carpet tiles cut from the web of FIG. 5.
Figure 8:
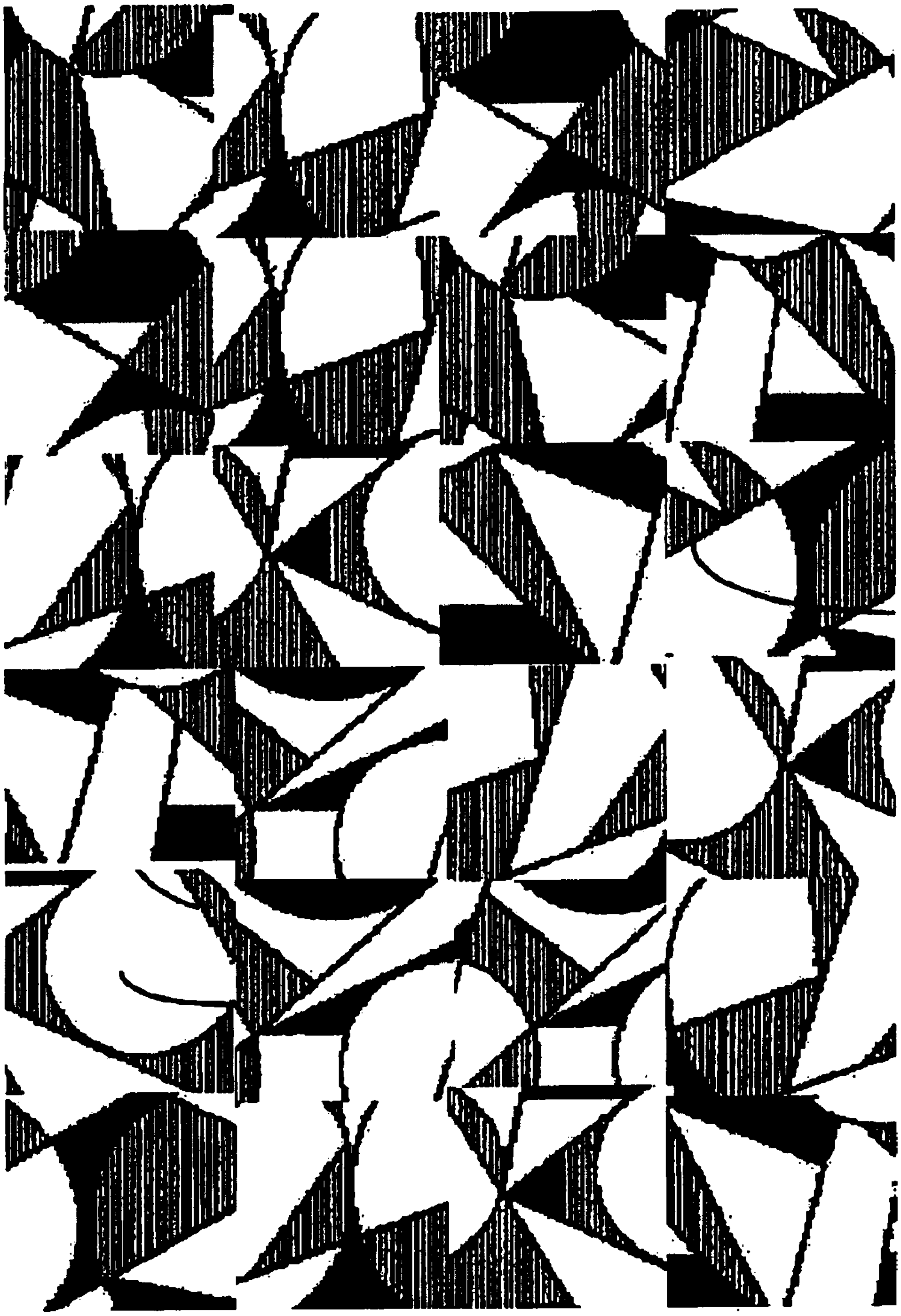
FIG. 8 is a top plan view of another assembly of the carpet tiles of FIG. 7.

While FIG. 1 illustrates a pattern having rectilinear shapes, other shapes may be used in a pattern to achieve orthogonal ambiguity. For example, FIG. 4 illustrates a pattern 100 having both rectilinear and curved shapes. FIG. 4 shows one full "repeat" of this embodiment of the pattern 100. A full "repeat" is one complete segment of the pattern. Generally, a carpet web will be formed with the pattern 100 repeating across the width of the web, i.e. with multiple pattern repeats across the web, as well as along the length of the web. For example, FIG. 5 illustrates a carpet web pattern 120 bearing three full repeats and a partial repeat of the pattern 100 for production on a carpet web. One of skill in the art would understand that a web having any number of full or partial repeats of the pattern 100 may be produced depending, in part, on manufacturing capabilities, including the equipment used to produce the web. FIG. 6 illustrates one way that the pattern 120 could be partitioned into multiple square carpet tile face designs 125. Thus, assuming that this invention is practiced by producing a carpet web, FIG. 6 illustrates one way that carpet tiles could be cut from that web. Moreover, FIG. 6 also illustrates designs that could be printed on the face of pre-formed carpet tiles. Note, however, that pattern 120 need not be partitioned into square designs, but rather any shape depending on the shape of the carpet tile on which the design will appear. Similarly, a carpet web bearing pattern 120 need not be cut into square tiles but rather may be cut into other rectilinear shapes, such as rectangles.

The pattern 100 includes a mixture of shapes that includes shapes having at least one curved side, such as circles 130. Multiple lines (see, e.g., 132 in FIG. 4), preferably, but not necessarily, straight lines, partition each circle 130, thereby dividing the circles 130 into secondary shapes defined by both rectilinear and curved elements. Thus, if the circles 130 are severed during web cutting, these truncated circles will not look out of place because the design already incorporates this feature (i.e., circles severed by straight lines). Rather, the edge of a tile placed during installation adjacent a truncated circle on another tile merely appears as yet another straight line partitioning the circle and not at all odd or out of place.

The pattern 100 preferably also includes elements that will parallel the "machine" (see, e.g., line 134) and "cross-machine" direction (see, e.g., line 136) of a web formed with the pattern, and therefore parallel the resulting tile edges. Incorporation into the pattern of these straight elements parallel to the tile edges mimics, and therefore helps to visually mask, the seams formed by abutment of adjacent tile edges so that these edges and seams are not prominent on the installation.

Orthogonal ambiguity is also achieved in the pattern 100 by including straight lines and shapes having straight edges (together "straight elements") that are neither parallel nor orthogonal to the longitudinal axis of the web on which pattern 100 is created and thus will not parallel a resulting tile edge (see, e.g., line 138). Rather, these straight elements are oriented at acute angles to the longitudinal axis of the web. It is preferable, but not required, that for every straight element oriented at an acute angle $\alpha$ relative to the longitudinal axis, another straight element be provided in the pattern that is oriented at that same angle $\alpha$ to a line orthogonal to the longitudinal axis of the web, or, said another way, is oriented relative to the longitudinal axis at the angle complementary to angle $\alpha$. Thus, rotation and replacement in a flooring assembly of a tile having a line oriented at an acute angle to the tile edge does not introduce lines in the assembly which form angles different from all other lines in the assembly. The tile, therefore, does not look out of place, but rather blends with the other tiles.

A web bearing pattern 100 may be, but does not have to be, manufactured using a conventional carpet tufting machine. Among other alternatives, the web may be produced on a carpet tufting machine having ¼ gauge and ⅛ gauge needle bars. By controlling the "thread-up" (i.e., the arrangement of yarn colors dedicated to the needles of the machine) and height of the yarn tufts, the pattern 100 (and full and partial repeats thereof, if desired) may be formed on a web.

Each needle is threaded with a dedicated yarn type (e.g., single color, space dyed, barber pole, etc.) and color(s). The shapes of the pattern 100 are formed on the web by color contrast between adjacent yarn colors on a single needle row and by color contrast between the yarn colors on the first needle row and the second needle row. Thus, the types and colors of yarn used should be selected to achieve the desired contrast. At least two colors must be used to achieve color contrast. However, it is preferable, but not necessary, to use more than two colors to contribute to the apparent randomness of the pattern.

The following is an example of a thread-up that uses a variety of colors to create the pattern 120 of FIG. 5 on a carpet web. However, any "thread-up" of the machine may be created in accordance with this invention so long as the resulting web, when appropriately cut, results in orthogonally ambiguous carpet tiles.

Row of ⅛ Gauge Needles

| Needle Position | Yarn |
|---|---|
| 1–124 | A B |
| 125–272 | A B A C |
| 273–440 | A C |
| 441–600 | A B A C |
| 601–648 | A B |

Row of ¼ Gauge Needles

| Needle Position | Yarn |
|---|---|
| 1–38 | D E |
| 39–116 | F E |
| 117–204 | F G |
| 205–284 | F E |
| 285–324 | D E |

The carpet web pattern 120 shown in FIG. 5 and this thread-up practices some, but not all, of the above-mentioned preferred guidelines. With this thread-up, as with the embodiment shown in FIG. 1, the color scheme of the resulting web is symmetrical about the central, longitudinal axis of the web. The background of the web is tufted by the ⅛ gauge needles. The tufts produced by the ⅛ gauge needles will generally be uniform in height. While, as explained above, any type of yarn may be used, the ⅛ gauge needles are preferably threaded with space dyed and solid color yarns.

Unlike the embodiment shown in FIG. 1, the background color with this thread-up is not the same across the resulting web. Rather, the background includes three different background yarns (A, B, and C), each having a particular background color(s). Background yarns A and B are alternately threaded on needles 1–124, background yarns A, B, and C are threaded on needles 125–272 (according to the order A B A C), etc. With this yarn scheme, every tile cut from the web bearing pattern 120 will have a similar mixture of background colors, thereby creating background uniformity among the tiles. To further uniformity, it may also be preferable, but certainly not required, that all of the background colors have similar intensities so that no one background color significantly stands out from the other background colors.

The pattern 120 is produced on the web by the ¼ gauge needles. The height of the tufts formed by the ¼ gauge needles varies depending on the pattern. While the ¼ gauge needles may be threaded with any type of yarn, barber pole yarn has proven particularly well-suited for this application. The ¼ gauge needles are threaded with primary yarns, in this case yarns D, E, F, and G, each having a particular primary color(s). Yarns D and E are alternately threaded on needles 1–38, yarns F and E are alternately threaded on needles 39–116, etc. As with the background colors, the primary colors may have, but do not have to have, similar intensities.

To create additional design elements (other than straight lines and circles) in the pattern during the manufacturing process, one or more of the needle bars may be, but do not have to be, shifted during tufting. For example, in a preferred embodiment, the ⅛ gauge needle bar is subjected to a 3×3×1 shift during tufting. In a 3×3×1 shift, the following sequence occurs: the needles penetrate twice, the bar shifts to the right one gauge (i.e., ⅛ of an inch if the ⅛ gauge bar is shifting), the needles penetrate twice, the bar shifts to the right one gauge, the needles penetrate twice, the bar shifts to the right one gauge, the needles penetrate twice, the bar shifts to the left one gauge, the needles penetrate twice, the bar shifts to the left one gauge, the needles penetrate twice, the bar shifts to the left one gauge, and the needles penetrate twice. At this point, the needles are back in their initial position relative to the web. This shifting introduces additional curved elements into the pattern by creating a snake-like or serpentine pattern on the web. However, this 3×3×1 shift pattern is merely exemplary, and the bar can be shifted in any number of sequences to alter the pattern formed on the web.

Tiles cut from the web having the above-described thread-up will have at least one background and one primary color in common with every other tile cut from the web. Moreover, the tiles are preferably cut so that a variety of shapes appear on each tile and few, if any, "entire" shapes (most importantly circles 130) appear on any tile. Use of multiple shapes and colors contributes to the apparent random quality of the pattern 100, thereby making an installation of such tiles appear to be continuous without regard to the orientation of the tiles within the installation. Thus, the tiles may be shuffled and laid in any orientation with respect to adjacent tiles without looking out of place to the ordinary viewer and without emphasizing that the flooring is modular, thereby still achieving an appearance of continuity across the entire installation as if the tiles were part of a broadloom web.

The foregoing is provided for the purpose of illustrating, explaining and describing embodiments of the present invention. Further modifications and adaptations to these embodiments will be apparent to those skilled in the art and may be made without departing from the spirit of the invention or the scope of the following claims. For instance, different shapes and sizes of shapes than those illustrated can be used. Similarly, a wide variety of color combinations are possible. Furthermore, while the embodiment described above is tufted, the face fabric could also be woven on a conventional or computer controlled Jacquard or other loom, and the face fabric could be fusion bonded or formed in other manners. Moreover, the patterns or portions thereof could be printed on pre-formed carpet tiles. This invention could also be used for modular flooring or surface covering materials other than carpet tile, such as vinyl tile.

We claim:

1. Carpet dies comprising tile edges and textile faces, each face having a pattern comprising a plurality of shapes having shape edges, wherein:

a. at least one of the shapes comprises at least one curved shape edge;

b. at least one of the shapes comprises a first straight shape edge that is parallel to at least one edge of the carpet tile on which the first straight shape edge appears;

c. the pattern comprises at least one background color and at least one color different from the at least one background color and of similar intensity to the as least one background color;

d. at least some adjacent shapes on each tile comprise as least one common color; and e. when the tiles are assembled on a flooring surface so that each tile is adjacent to and abuts at least one other tile the tiles exhibit orthogonal ambiguity without pattern alignment between adjacent tiles.

2. The carpet tiles of claim 1, wherein the tiles are formed by tufting a carpet web and cutting the web into tiles.

3. The carpet tiles of claim 2, wherein the at least one background color and the at least one color different from the background color each comprises a plurality of colors and wherein the carpet web is formed by rows of tufts across the web, each of which rows comprises tufts of a first gauge and a second gauge, the first gauge comprising tufts of the at least one background color formed by a series of yarns AB, followed by a series of yarns ABAC, followed by a series of yarns AC, followed by a series of yarns ABAC, followed by a series of yarns AB, and the second gauge comprising tufts of the at least one color different from she background color formed by a series of yarns DE, followed by a series of yarns FE, followed by a series of yarns FG, followed by a series of yarns FE, followed by a series of yarns DE, wherein each of yarns A–F comprises a different color or shade of a color from each of the other yarns.

4. The carpet tiles of claim 1, wherein the tiles are formed by printing at least a portion of the pattern on each tile.

5. The carpet tiles of claim 1, wherein the faces are tufted.

6. The carpet tiles of claim 1, wherein the faces are woven.

7. The carpet tiles of claim 1, wherein the faces are bonded.

8. The carpet tiles of claim 1, wherein at least one of the shapes comprises a second straight shape edge that is not parallel to the tile edges on which the second straight shape edge appears.

9. Floorcovering comprising at least two carpet tiles of claim 1 positioned abutting on a flooring surface.

10. A method of producing the carpet tiles of claim 1 comprising designing a pattern for a carpet web having a longitudinal axis, producing the carpet web with the pattern, and cutting the carpet web into the tiles, wherein the pattern for the carpet web is designed by a method comprising:

a. selecting at least one background color for the carpet web;

b. using a plurality of colors, including the background color, to form primary shapes on the carpet web, wherein at least some of the primary shapes comprise at least one curved side and are at least partially partitioned by at least one line to form secondary shapes comprising at least one curved element; and c. positioning the primary and secondary shapes on the carpet web so that at least some adjacent shapes have at least one common color.

11. The method of claim 10, wherein the pattern is further designed by forming, with the plurality of colors, at least one straight line at an acute angle to the longitudinal axis of the web and at least one other straight line at the same angle to a line orthogonal to the longitudinal axis of the web.

12. The method of claim 10, wherein the carpet web is produced using a tufting machine.

13. The method of claim 12, wherein the tufting machine comprises needles, at least some of which are shifted laterally relative to the web during tufting.

14. The method of claim 12, wherein yarns of the plurality of colors are used to tuft the carpet web.

15. The method of claim 12, wherein at least some of the yarns are space dyed yarns.

16. The method of claim 12, wherein at least some of the yarns are single color yarns.

17. The method of claim 12, wherein at least some of the yarns are barber pole yarns.

18. Carpet tiles cut from a carpet web comprising a web face having a web pattern comprising a plurality of primary shapes formed by a plurality of colors, wherein at least some of the plurality of primary shapes each comprises at least one curved side and is at least partially partitioned by at least one line to form secondary shapes comprising at least one curved element, the tiles cut from the web comprising a common color and each having a tile pattern, wherein the tile pattern of at least some tiles cut from the web comprises:

a. at least a portion of a curved element;

b. a first straight element that is parallel to at least one edge of the carpet tile on which the first straight element appears;

c. at least one background color and at least one color different from the at least one background color and of similar intensity to the at least one background color; and d. at least some adjacent shapes having at least one common color, wherein the tiles cut from the web can be positioned adjacent and abutting on a flooring surface in any of at least sixteen rotational and positional orientations relative to each other without any tile appearing to be out of place when the tile patterns of adjacent tiles do not align.

19. The carpet tiles of claim 18, wherein the tiles are square.

20. The carpet tiles of claim 18, wherein at least some of the tile patterns comprise a second straight element that is not parallel to at least one edge of the carpet tile on which the second straight element appears.

21. The carpet tiles of claim 18, wherein at least one of the tile patterns comprises more than one background color.

22. The carpet tiles of claim 18, wherein at least one of the tile patterns comprises more than one color different from the at least one background color.

23. Floorcovering comprising a plurality of carpet tiles of claim 18, positioned on a flooring surface so that each tile is adjacent to and abuts at least one other tile.

* * * * *